US008326049B2

(12) United States Patent
Rovati et al.

(10) Patent No.: US 8,326,049 B2
(45) Date of Patent: Dec. 4, 2012

(54) METHOD AND SYSTEM FOR THE TREATMENT OF MULTIPLE-DESCRIPTION SIGNALS, AND CORRESPONDING COMPUTER-PROGRAM PRODUCT

(75) Inventors: Fabrizio Simone Rovati, Cinisello Balsamo (IT); Andrea Lorenzo Vitali, Bergamo (IT)

(73) Assignee: STMicroelectronics S.r.l., Argate Brianza (IT)

( * ) Notice: Subject to any disclaimer, the term of this patent is extended or adjusted under 35 U.S.C. 154(b) by 1771 days.

(21) Appl. No.: 11/269,121

(22) Filed: Nov. 8, 2005

(65) Prior Publication Data

US 2006/0110054 A1 May 25, 2006

(30) Foreign Application Priority Data

Nov. 9, 2004 (IT) ................ TO2004A0780

(51) Int. Cl.
*G06K 9/36* (2006.01)
(52) U.S. Cl. ..................................................... 382/232
(58) Field of Classification Search .............. 382/232; 375/240.21, E7.088; 709/219
See application file for complete search history.

(56) References Cited

U.S. PATENT DOCUMENTS

| | | | | |
|---|---|---|---|---|
| 5,384,670 A | * | 1/1995 | Gillard et al. | 360/48 |
| 5,521,918 A | * | 5/1996 | Kim | 370/428 |
| 5,585,850 A | * | 12/1996 | Schwaller | 375/240.01 |
| 5,596,686 A | | 1/1997 | Duluk, Jr. | 395/122 |
| 5,847,772 A | * | 12/1998 | Wells | 348/571 |
| 6,137,912 A | | 10/2000 | Kostrzewski et al. | 382/236 |
| 6,891,565 B1 | | 5/2005 | Dieterich | 348/180 |
| 2002/0001348 A1 | * | 1/2002 | Yiwen et al. | 375/240.26 |
| 2002/0097175 A1 | * | 7/2002 | Wong et al. | 341/144 |
| 2002/0188440 A1 | | 12/2002 | Foster et al. | 704/200.1 |
| 2003/0009535 A1 | * | 1/2003 | Apostolopulos et al. | 709/219 |
| 2003/0043907 A1 | * | 3/2003 | Nakayama | 375/240.08 |
| 2003/0158881 A1 | * | 8/2003 | Liao et al. | 708/700 |
| 2004/0066793 A1 | * | 4/2004 | Van Der Schaar | 370/437 |
| 2005/0015511 A1 | | 1/2005 | Izmailov et al. | 709/238 |
| 2005/0027521 A1 | | 2/2005 | Gavrilescu et al. | 704/230 |
| 2005/0175099 A1 | | 8/2005 | Sarkijarvi et al. | 375/240.16 |
| 2005/0249425 A1 | | 11/2005 | Paniconi et al. | 382/240 |
| 2006/0109901 A1 | | 5/2006 | Ye et al. | 375/240.08 |

(Continued)

FOREIGN PATENT DOCUMENTS

WO 03/005676 1/2003

(Continued)

OTHER PUBLICATIONS

Turner et al. ("Image transfer: An End-to-End Design", Aug. 1992, pp. 258-268, conference proceeding on communications Architectures and protocols).*

(Continued)

*Primary Examiner* — Vu Le
(74) *Attorney, Agent, or Firm* — Seed IP Law Group PLLC

(57) ABSTRACT

A processing system, such as typically a CPU, is used for converting a digital signal organized in pixels, such as a video signal, between a first format and a second multiple-description format. The system comprises at least one input register and at least one output register, and is configured via instructions, that can be constituted at least in part by instructions of a SIMD type, so as to: order the pixels of the signal to be converted in a set of input registers; and take selectively the pixels from the aforesaid set of input registers and place them in an orderly way in at least one output register.

36 Claims, 7 Drawing Sheets

U.S. PATENT DOCUMENTS

| | | | |
|---|---|---|---|
| 2007/0204203 A1 | 8/2007 | Chou et al. | 714/770 |
| 2008/0075171 A1 | 3/2008 | Suzuki | 375/240.16 |

FOREIGN PATENT DOCUMENTS

| | | | |
|---|---|---|---|
| WO | 03/005677 | | 1/2003 |
| WO | 03/005761 | | 1/2003 |
| WO | 2004/014083 | | 2/2004 |
| WO | 2004/032517 | | 4/2004 |
| WO | 2004/046879 | | 6/2004 |
| WO | 2004/047425 | | 6/2004 |
| WO | 2004/056121 | | 7/2004 |
| WO | 2004/057876 | | 7/2004 |
| WO | WO 2004/057876 | * | 7/2004 |

OTHER PUBLICATIONS

Apostolopoulos et al., "Modeling Path Diversity for Multiple Description Video Communication," IEEE, May 2002, pp. 2161-2164.

Apostolopoulos et al., "On Multiple Description Streaming with Content Delivery Networks," IEEE Infocom, Jun. 2002, pp. 1-10.

Apostolopoulos et al., "Unbalanced Multiple Description Video Communication Using Path Diversity," IEEE International Conference on Image Processing (ICIP), Thessaloniki, Greece, Oct. 2001, 4 pages.

Apostolopoulos et al., "Video Streaming: Concepts, Algorithms, and Systems," HP Laboratories, Palo Alto, California, Sep. 18, 2002, 35 pages.

Cosman et al., "Vector Quantization of Image Subbands: A Survey," Sep. 14, 1995, 43 pages.

Goyal, "Beyond Traditional Transform Coding," Dissertation, University of California, Berkley, Fall 1998, 233 pages.

Goyal et al., "Multiple Description Transform Coding of Images," Proceedings of IEEE Conference on Image Processing, Chicago, Illinois, Oct. 1998, 5 pages.

Gray et al., "Quantization," IEEE Transactions on Information Theory 44(6):2325-2383, Oct. 1998.

Kovacevic et al., "Multiple Descriptions—Source-Channel Coding Methods for Communications," Bell Labs, Innovations for Lucent Technology, Murray Hill, New Jersey, 1998, 14 pages.

Puri et al., "Application of FEC based Multiple Description Coding to Internet Video Streaming and Multicast," Proceedings of the Packet Video 200 Workshop, Forte Village Resort, Sardinia, Italy, May 2000, 10 pages.

Puri et al., "Forward Error Correction (FEC) Codes based Multiple Description Coding for Internet Video Streaming and Multicast," Signal Processing: Image Communication 16(8): May 2001, 18 pages.

Puri et al., "Multiple Description Source Coding using Forward Error Correction Codes," Proceedings of the $33^{rd}$ Asilomar Conference on Signals, Systems, and Computers, Pacific Grove, California, Oct. 1999, 5 pages.

Servetto, "Compression and Reliable Transmission of Digital Image and Video Signals," Thesis, University of Illinois at Urbana-Champaign, 1999, 108 pages.

Swann, "MPEG-II Video Coding for Noisy Channels," Signal Processing and Communication Lab, University of Cambridge, Mar. 1998, 191 pages.

Wah et al., "A Survey of Error-Concealment Schemes for Real-Time Audio and Video Transmissions over the Internet," Proc. IEEE International Symposium on Multimedia Software Engineering, Dec. 2000, 8 pages.

* cited by examiner

Fig-3

| A0 | B0 | A1 | B1 | A2 | B2 | A3 | B3 |
|----|----|----|----|----|----|----|----|
| C0 | D0 | C1 | D1 | C2 | D2 | C3 | D3 |

33

36a: A0 | A1 | A2 | A3
36b: B0 | B1 | B2 | B3
36c: C0 | C1 | C2 | C3
36d: D0 | D1 | D2 | D3

34 →
38 ←

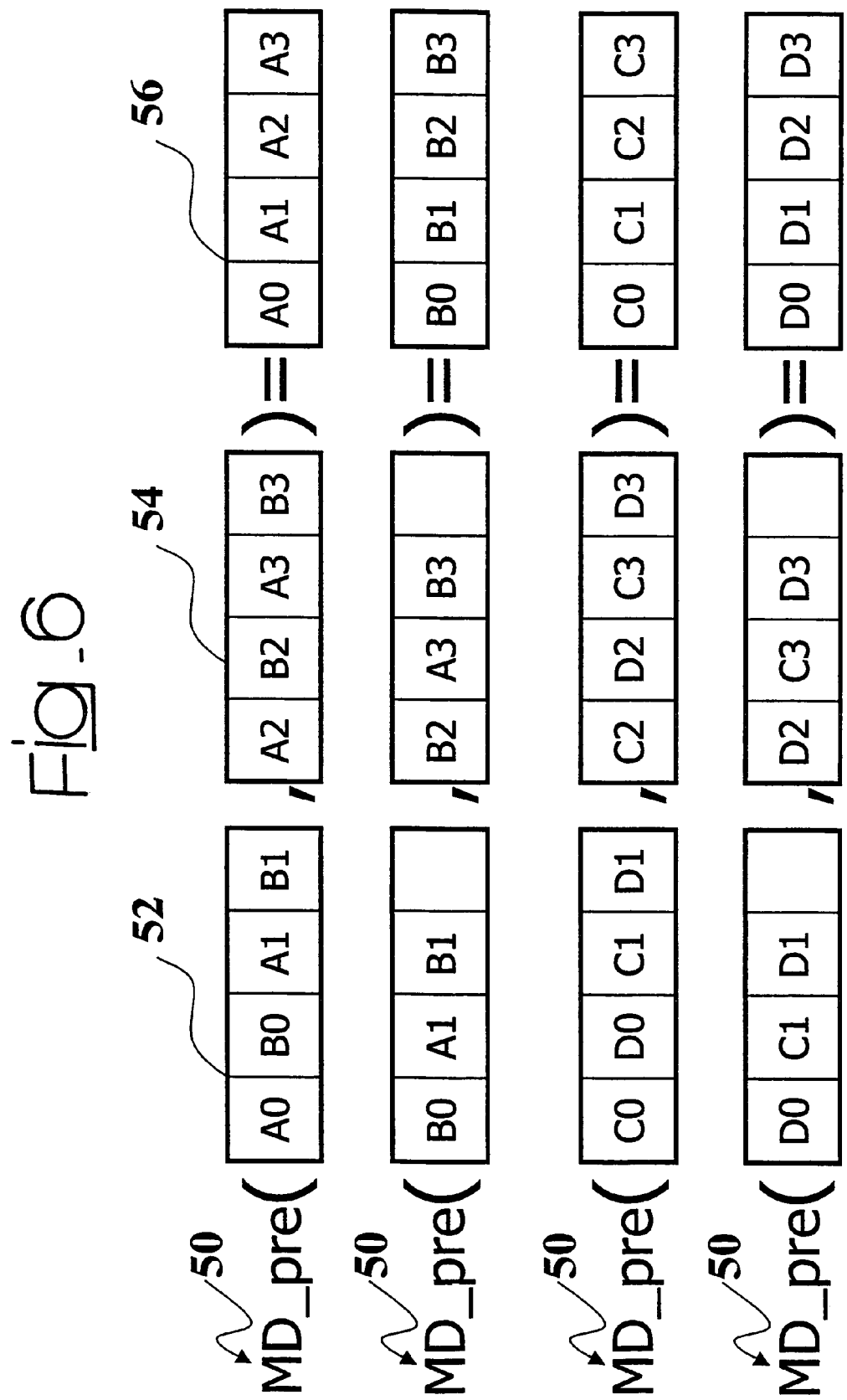

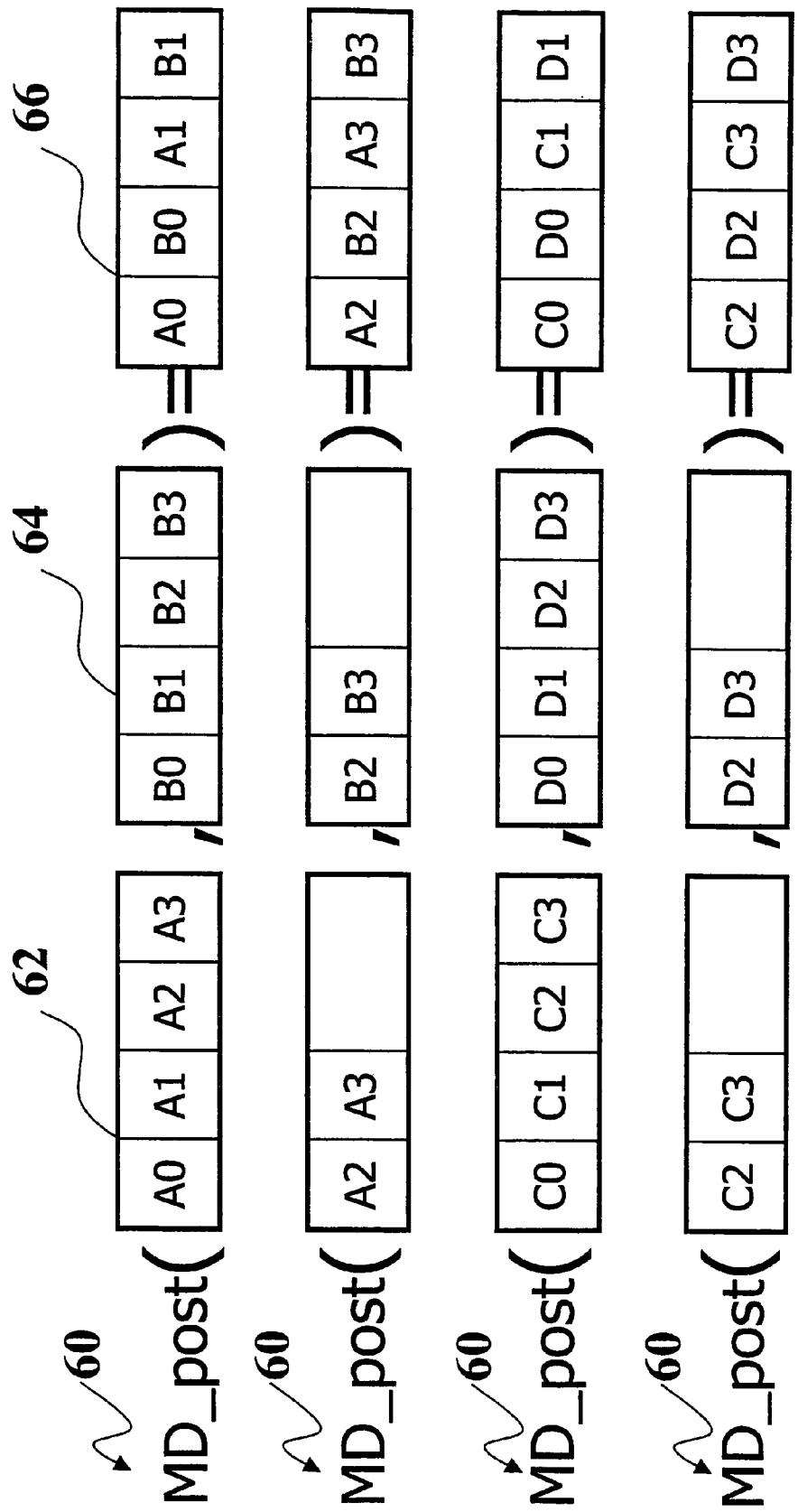

METHOD AND SYSTEM FOR THE TREATMENT OF MULTIPLE-DESCRIPTION SIGNALS, AND CORRESPONDING COMPUTER-PROGRAM PRODUCT

BACKGROUND OF THE INVENTION

1. Field of the Invention

The present invention relates to techniques for the treatment of signals organized in pixels (picture elements), and has been developed with particular attention paid to its possible application to processing of video signals implemented by resorting to multiple-description (MD) techniques.

Reference to this particular field of application should not, however, be interpreted as in anyway limiting the scope of the invention.

2. Description of the Related Art

The techniques based upon multiple description form the subject of an extensive scientific literature, as witnessed, for example, by the following studies:

P. C. Cosman, R. M. Gray, M. Vetterli, "Vector Quantization of Image Subbands: a Survey", September 1995;

Robert Swann, "MPEG-2 Video Coding over Noisy Channels", Signal Processing and Communication Lab, University of Cambridge, March 1998;

Robert M. Gray "Quantization", IEEE Transactions on Information Theory, vol. 44, No. 6, October 1998, pp. 2325-2383;

Vivek K. Goyal, "Beyond Traditional Transform Coding", University of California, Berkeley, Fall 1998;

Jelena Kovačević, Vivek K. Goyal, "Multiple Descriptions—Source-Channel Coding Methods for Communications", Bell Labs, Innovation for Lucent Technologies, 1998;

Jelena Kovačević, Vivek K. Goyal, Ramon Arean, Martin Vetterli, "Multiple Description Transform Coding of Images", Proceedings of IEEE Conf. on Image Proc., Chicago, October 1998;

Sergio Daniel Servetto, "Compression and Reliable Transmission of Digital Image and Video Signals", University of Illinois at Urbana-Champaign, 1999;

Benjamin W. Wah, Xiao Su, Dong Lin, "A survey of error-concealment schemes for real-time audio and video transmission over internet", Proceedings of IEEE International Symposium on Multimedia Software Engineering, December 2000;

John Apostolopoulos, Susie Wee, "Unbalanced Multiple Description Video Communication using Path Diversity", IEEE International Conference on Image Processing (ICIP), Thessaloniki, Greece, October 2001;

John Apostolopoulos, Wai-Tian Tan, Susie Wee, Gregory W. Wornell, "Modeling Path Diversity for Multiple Description Video Communication", ICASSP, May 2002;

John Apostolopoulos, Tina Wong, Wai-Tian Tan, Susie Wee, "On Multiple Description Streaming with Content Delivery Networks", HP Labs, Palo Alto, February 2002, pp. 1 to 10;

John Apostolopoulos, Wai-Tian Tan, Susie J. Wee, "Video Streaming: Concepts, Algorithms and Systems", HP Labs, Palo Alto, September 2002;

Rohit Puri, Kang-Won Lee, Kannan Ramchandran, and Vaduvur Bharghavan, "Forward Error Correction (FEC) Codes Based Multiple Description Coding for Internet Video Streaming and Multicast" Signal Processing: Image Communication, Vol. 16, No. 8, pp. 745-762, May 2001;

Rohit Puri and Kannan Ramchandran, "Multiple Description Source Coding Through Forward Error Correction Codes", in the Proceedings of the 33rd Asilomar Conference on Signals, Systems, and Computers, Pacific Grove, Calif., October 1999; and Rohit Puri, Kang-Won Lee, Kannan Ramchandran and Vaduvur Bharghavan, "Application of FEC based Multiple Description Coding to Internet Video Streaming and Multicast", Proceedings of the Packet Video 2000 Workshop, Forte Village Resort, Sardinia, Italy, May 2000.

With specific reference to the patent literature, it is possible to cite, as general references on the subject, the documents Nos. WO-A-2004/057876, WO-A-2004/046879, WO-A-2004/047425, WO-A-2004/014083, WO-A-2003/005676, WO-A-2003/005677, WO-A-2003/0005761, WO-A-2004/032517, and WO-A-2004/056121.

Notwithstanding the extensive activities documented, for example, by the literature cited above, there still exists the need for developing solutions that are truly efficient for the treatment of multiple-description signals, in particular for the treatment of video signals at a CPU level.

BRIEF SUMMARY OF THE INVENTION

One embodiment of the present invention provides a solution which will be able to meet the aforesaid need.

One embodiment of the present invention is directed to a method having the characteristics recalled in the ensuing claims. Another embodiment of the present invention relates also to a corresponding system, typically configurable as CPU, as well as a computer-program product, which can be loaded into the memory of at least one computer and comprises portions of software code for implementing the aforesaid method. As used herein, reference to such a computer-program product is understood as being equivalent to reference to a computer-readable medium containing instructions for controlling a computer system in order to co-ordinate execution of the method according to the invention. Reference to "at least one computer" is intended to highlight the possibility for the present invention to be implemented in a distributed and/or modular way, for example on various CPUs.

The claims form an integral part of the disclosure of the invention provided in the present application.

In its currently preferred embodiment, the invention enables generation of instructions that can be entered within the ISA (Instruction Set Architecture) instruction set of any computer circuit, such as, for example, RISC (Reduced Instruction Set Computer) computers, CISC (Complex Instruction Set Computer) computers, VLIW (Very Long Instruction Word) computers, or superscalar microprocessors.

An embodiment of the invention that is at the moment particularly preferred envisages conversion (in one direction or in the other) of a digital signal organized in pixels, between a first format and a second format, the second format comprising multiple descriptions of the digital signal. The method comprises the operations of ordering the pixels of the signal to be converted into at least one input register and then taking the pixels selectively from the input registers and placing them in an orderly way in at least one output register.

BRIEF DESCRIPTION OF THE DRAWINGS

The invention will be now described, by way of non-limiting example, with reference to the figures of the annexed plate of drawings, in which:

FIGS. 3 to 7 represent the implementation of steps of the method described herein.

DETAILED DESCRIPTION OF THE INVENTION

The detailed description provided in what follows relates, purely by way of example, to the coding of a digital video signal implemented with subsampled polyphase multiple descriptions. In practice, the solution described herein by way of example operates by splitting the original sequence of the video signal into N sub-sequences, where N is an integer, for example four or two.

Figure 1:
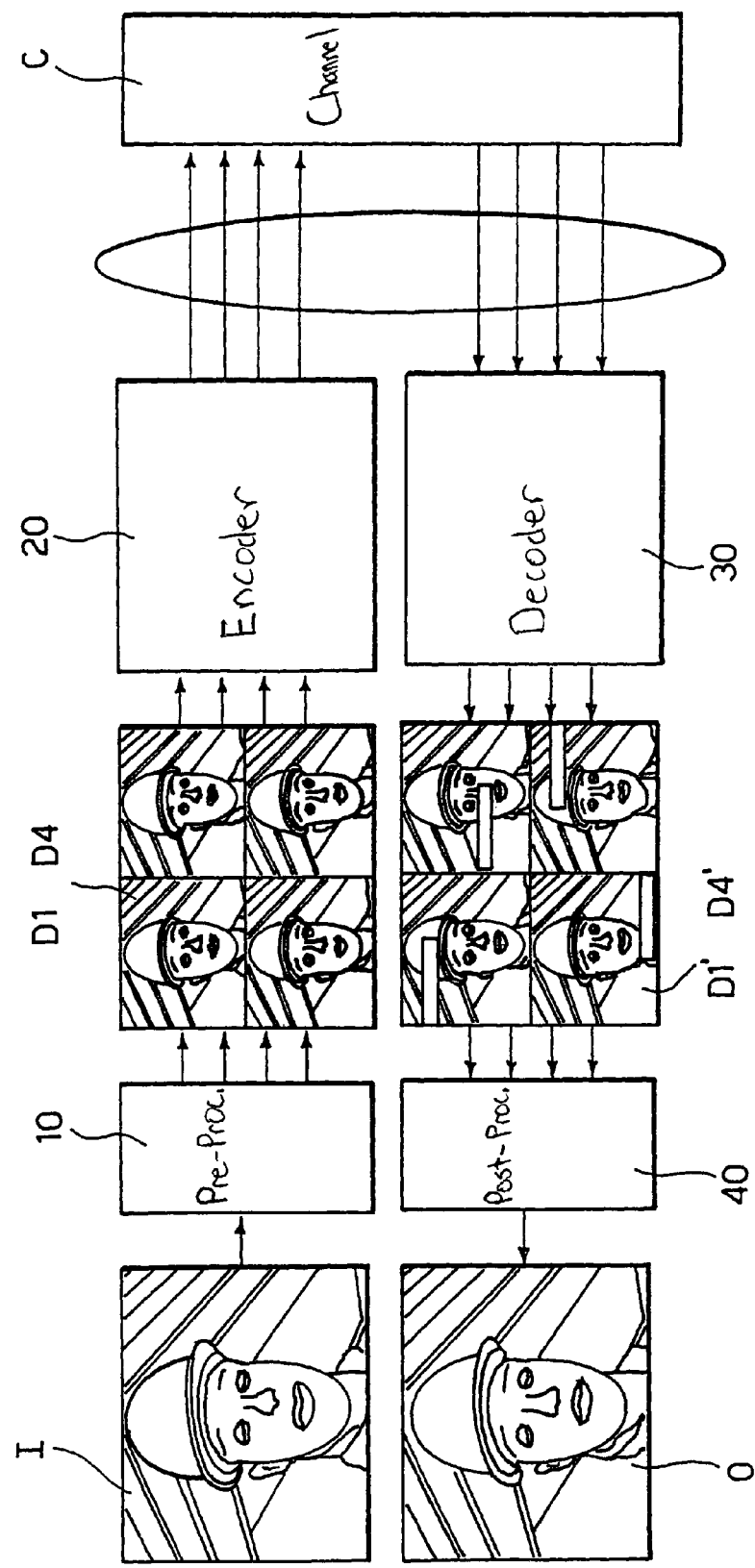
FIG. 1 shows an example of transmission of a video signal via multiple descriptions.

FIG. 1 represents a multiple-description transmission system applied, for example, to the transmission of digital video signals; said system envisages the use of four multiple descriptions.

In detail, an input video signal I is subjected to pre-processing in a block 10 so as to generate, for example, four descriptions D1 to D4. These are then passed on to an encoder 20 (of any known type), then to be "transmitted" on a channel C. This can be constituted by a transmission channel proper (for example, a channel comprised in a fixed and/or mobile network with a video-streaming function) or by a recording medium (for example a tape, a disk, a digital memory, and so on), on which the encoded digital signals are written so as to be then read, even at a distance in time and space.

The signals received after "transmission" on the channel C are sent on to a decoder 30 for recovery of multiple descriptions D1' to D4', which are then merged in a post-processing stage 40 to obtain an output video signal O.

Figure 2:
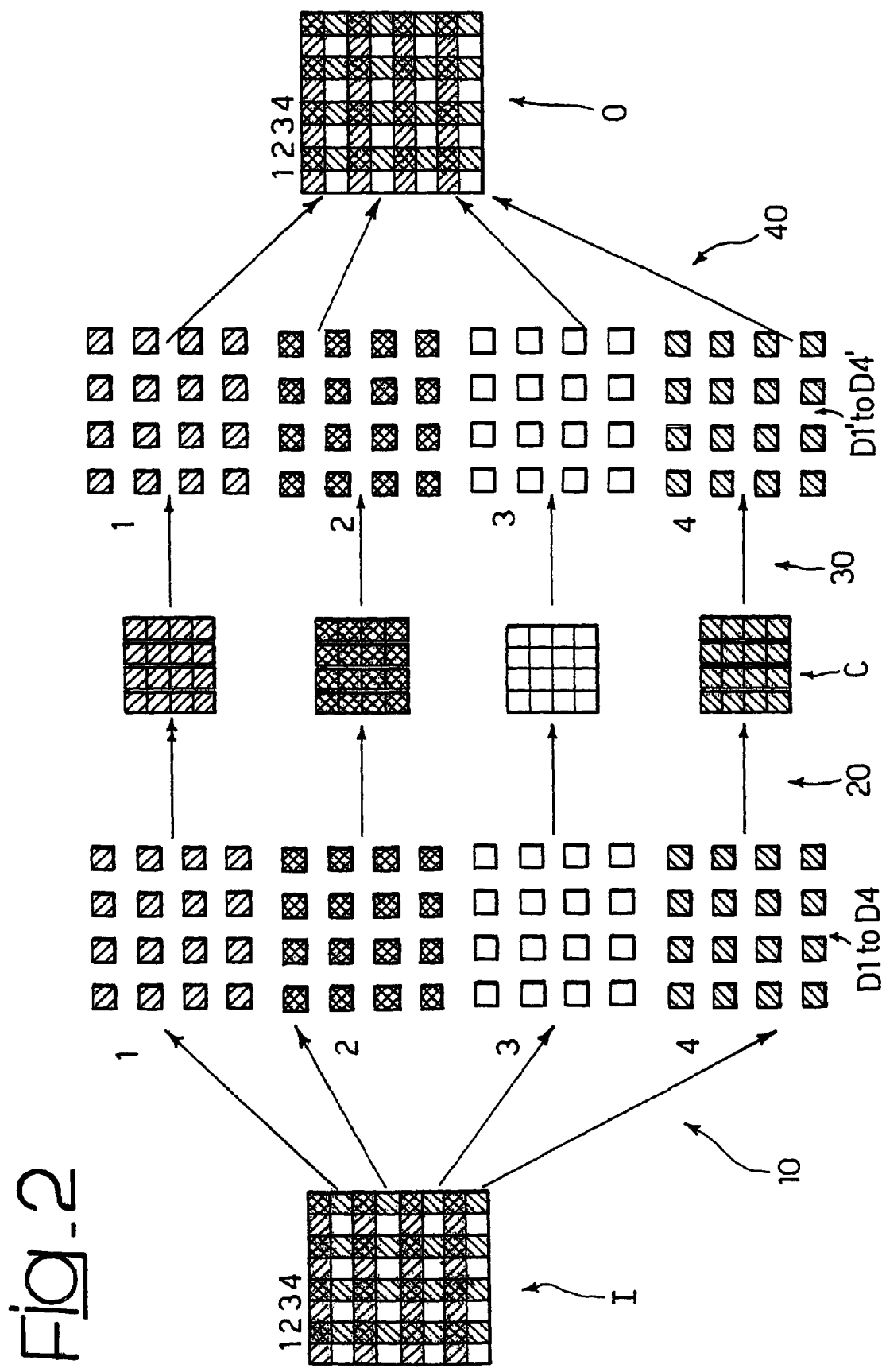
FIG. 2 shows the process of reconstruction of a video signal transmitted via multiple descriptions.

The simplest case of polyphase subsampling is obtained when the original pixels of the signal I are simply demultiplexed, as shown schematically in FIG. 2.

In FIG. 2 the same references already adopted in FIG. 1 are used to designate the original video signal I, the multiple descriptions D1 to D4 derived from the input video signal I, the channel C, the multiple descriptions D1' to D4' received from the channel, and the output video signal O. Also here, the reference numbers 10, 20, 30, and 40 designate, respectively, the pre-processing process which precedes encoding, the encoding process, the decoding process, and post-processing process subsequent to decoding.

The above technique, to which reference is made herein by way of example, constitutes a low-cost solution for the coding with subsampled polyphase multiple descriptions. It is, moreover, a solution that is particularly suited to a software implementation.

The idea underlying the solution described herein envisages implementing subsampling by resorting to instructions referred to as "SIMD (Single Instruction Multiple Data) instructions". By "SIMD instruction" is meant, in general, a single instruction that is applied in parallel to a number of data. It enables compact writing of the programs (which are lists of instructions). Using a SIMD it is possible, for example, to avoid repeating the same instruction for all the data to which it is to be applied.

FIG. 3 regards, again by way of example, treatment of images, which, for reasons of simplicity, are assumed as being constituted by 8×2 pixels. This example has been chosen because it enables reference to be made to the four registers of a 32-bit processor.

It is evident that this example can be extended in a simple way to situations in which operations are carried out with 4×2-pixel images on 16-bit processors and with 16×2-pixel images on 64-bit processors.

In FIG. 3, the arrow 34 indicates the direction of the pre-processing (module 10 of FIG. 1), in which the information data regarding the image, designated by 33, are stored in the four registers 36a, 36b, 36c and 36d.

The arrow 38 indicates, instead, the direction of the post-processing (module 40 of FIG. 1).

Specifically, FIG. 3 exemplifies the case of appropriate SIMDs for creating/merging 4 descriptions obtained from simple polyphase subsampling of 2×2 blocks of pixels.

The sequence examined from top to bottom illustrates the creation of the four descriptions. At the top it may be seen how the bytes corresponding to each pixel are loaded into the registers of the machine. The blocks to be subsampled are designated by the numbers 0, 1, 2 and 3. Indicated in each block are the 4 pixels that are to be demultiplexed in the 4 descriptions: A, B, C and D. At the bottom, the result of pre-processing appears. It may be noted that now each register contains the pixels of just one description (A, B, C or D).

The sequence examined from bottom to top illustrates, instead, merging of the four descriptions. At the bottom, it may be seen how the bytes corresponding to the pixels of the descriptions are loaded into the registers of the machine. The pixels of each description are designated by the letters A, B, C and D. Indicated for each pixel is the number of the block in which it will be multiplexed: 0, 1, 2 and 3. At the top, the result of post-processing appears. Is may be noted that now the pixels are arranged in such a way that pixels of the same block are adjacent, since they occupy their original position.

The two instructions necessary for the steps of method can be called MD_pre and MD_post. The instruction MD_pre, designated by 50 in FIG. 4, receives at input the contents of two registers 52 and 54, said contents being designated, respectively, by S3, S2, S1, S0 and T3, T2, T1, T0 in order to identify in a general way the contents of the information data 33 of FIG. 3, taken each time in pairs.

In particular, the instruction MD_pre performs the function of demultiplexing of the pixels. For the example represented, this corresponds to taking just the odd pixels from the input registers (the first, the third, etc.). In a more general case, this corresponds to taking one pixel every N pixels (if 1 pixel is taken every 2, we re-encounter the previous case). In a still more general case, it corresponds to taking the first M pixels of each group of N pixels. Finally, the maximum generalization is obtained by taking any M pixels, even non-adjacent ones, from each group of N pixels.

The instruction MD_post performs the function of multiplexing of the pixels. For the example represented, this corresponds to putting in the odd-position pixels the pixels of an input register (and consequently, putting in the even pixels the pixels of the other register), reversing the demultiplexing operation performed by MD_pre. The generalizations are similar to the ones described in the previous paragraph.

Figure 4:
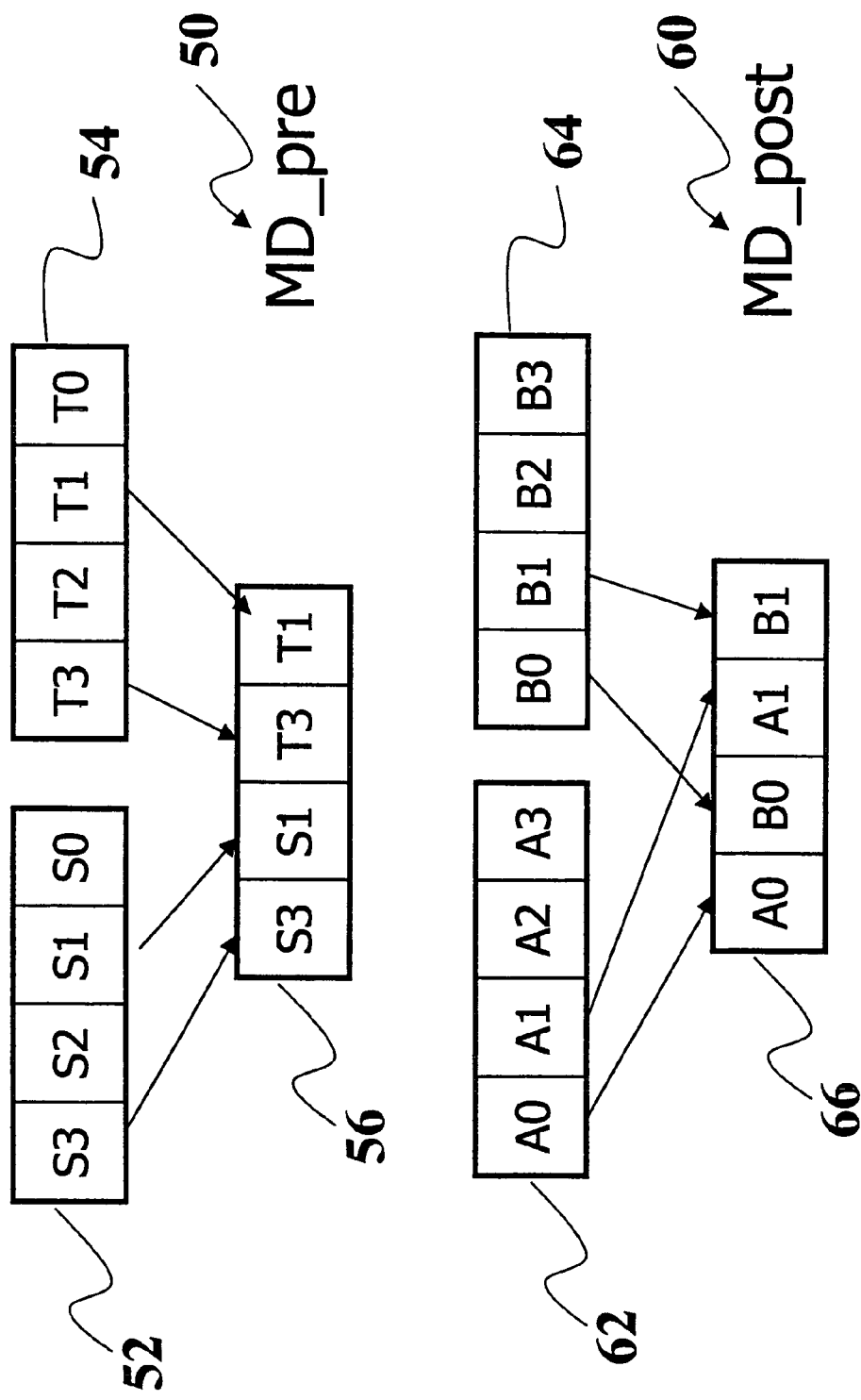
Figure 5:
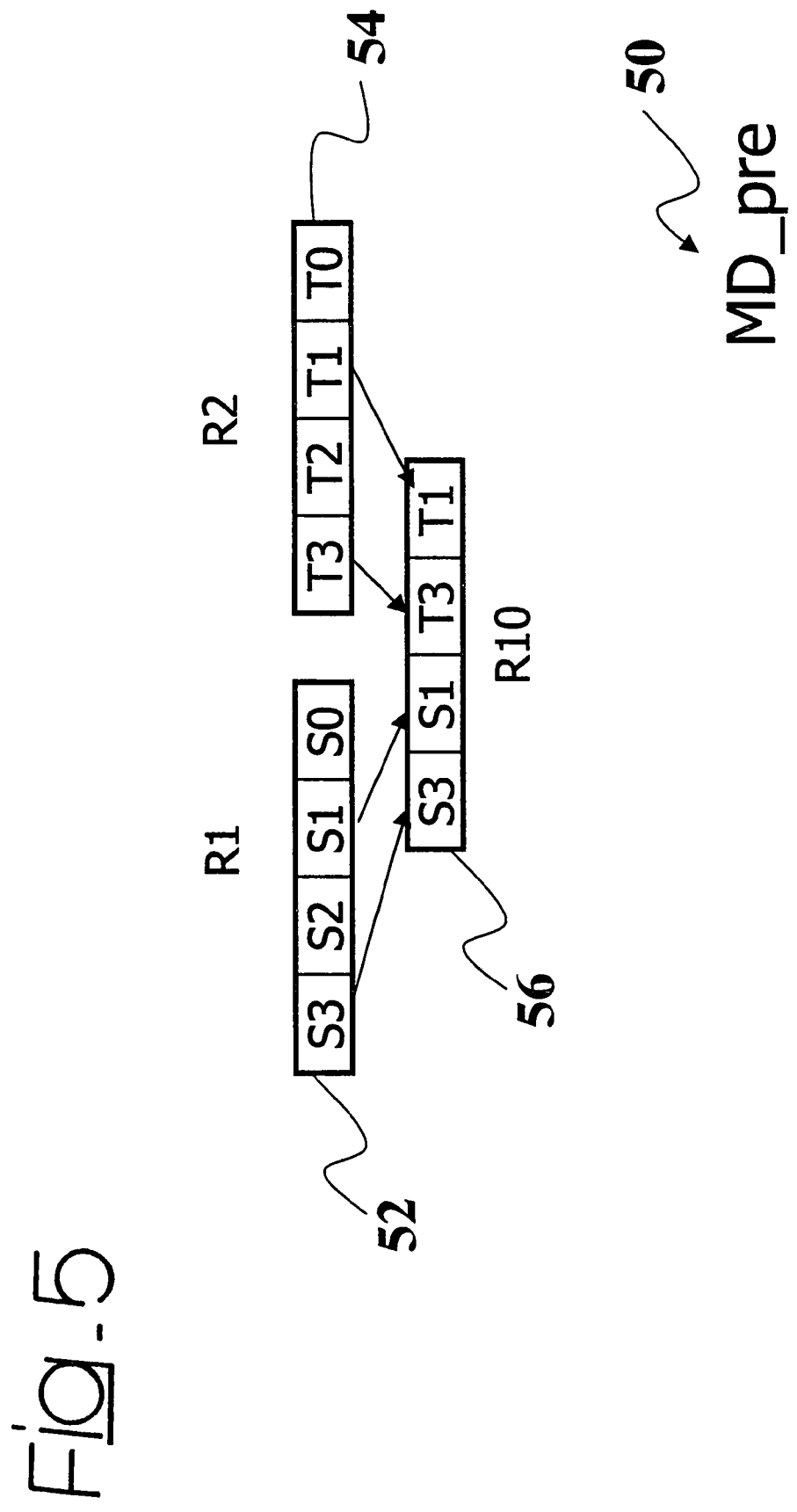

As represented in the upper part of FIG. 4 and in FIG. 5, the instruction 50 restores at output some of the bits of the input registers, more in particular the odd-position bits, starting counting from the left. These bits are entered into an output register 56 in an orderly way, i.e., first the two bits taken from the register 52 and then the two bits taken from the register 54.

If this instruction is called four times on different data, it is capable of extracting correctly the four descriptions, as shown in FIG. 6.

Is will be appreciated that the case illustrated in FIG. 4 regards 32-bit registers; consequently, each square represents a group of 8 bits and not just one bit. Hence, reference is not made to odd-position bits, but to odd-position bytes. Separating the odd bytes corresponds to taking the first 8 bits of a group of 16, which corresponds to one of the generalizations described previously.

To consider the question in terms of bits is however useful because it is much more generic. The video and the images are described by the pixels, and each pixel corresponds, usually, to a byte for convenience of processing with the existing architectures. However, already now in high-quality professional machines use of 9, 10 or else 11 bits per pixel is envisaged.

In the case of just two descriptions, it may be assumed that the descriptions 3 and 4 form part of the descriptions 1 and 2, so that the process will not change and only the final storage position will differ in the two cases.

In greater detail, in the case of two descriptions generated by horizontal polyphase subsampling, the processing consists in separating the odd pixels from the even ones. The case of 4 descriptions generated by horizontal and vertical polyphase subsampling of 2×2-pixel blocks can be brought back to the previous case by processing first just the odd rows and then just the even rows, and separating odd pixels and even pixels of each row. This corresponds to creating 2 descriptions from the odd rows, storing them in an appropriate position, and creating another 2 descriptions (for a total of 4) from the even rows, storing them in another appropriate position.

The instruction MD_post 60 operates in a dual way with respect to the instruction MD_pre 50, as shown in the lower part of FIG. 4 and in FIG. 7. The instruction MD_post 60 receives at input two registers 62 and 64. The instruction returns at output the first two bits of the two registers 62 and 64, starting from the left and places them in an output register 56, in the first and in the third positions or else in the second and in the fourth positions, respectively, always counting from the left.

Basically, the conversion from the starting format (signal I) to the multiple-description format envisages performing a plurality of times the operations of ordering and taking selectively the pixels of the signal to be converted, generating each time one of the multiple descriptions D1, D2, D3, D4 of the signal in the second format. In particular, in the example just described, the operation of treatment of the pixels of the signal to be converted is performed by operating each time on different sets of pixels. Specifically, the example illustrated in the upper part of FIG. 4 envisages that the pixels of the signal to be converted into the multiple-description format will be taken from alternating positions of the input registers 52, 54 and then placed in adjacent positions in the output register 56.

In the conversion in the opposite direction, i.e., in the conversion from the multiple-description format to the non-encoded format (i.e., in the example illustrated in the lower part of FIG. 4), there is envisaged taking the pixels of the signal to be converted from adjacent positions in the input registers 62, 64 and then placing them in alternating positions in the output register 66.

In either direction of conversion (i.e., in the conversion both to the multiple-description format and starting from said format) the output register 56, 66 has a number of pixel positions equal to one half of the total pixel positions of the input registers 52, 54 or else 62, 64.

The mode of operation described and the corresponding instructions enable a result to be obtained that otherwise would require ten normal RISC instructions on a computer circuit with a reduced instruction set in order to implement the same process obtained by executing one instruction MD_pre 50 and one instruction MD_post 60, as shown hereinafter.
and(R1, R10, 0xFF000000);
and(R1, R11, 0x0000FF00);
Shl(R11, 8, R11);
or (R10, R11, R10);
and(R2, R11, 0xFF000000);
Shr(R11, 16, R11);
or(R10, R11, R10);
and(R2, R11, 0xFF000000);
Shl(R11, 8, R12);
or (R10, R11, R10);

It may be seen that the process of transformation of an original 8×2 sequence (on a 32-bit processor), or of an original 16×2 sequence (on a 64-bit processor), or of an original 4×2 sequence (on a 16-bit processor) into four multiple descriptions, and its reverse process, can be achieved with 16 RISC instructions each, as shown hereinafter.

Pre-Processing:
Load(R1);
Load(R2);
Load(R3);
Load(R4);
Shl(R1, 8, R5);
Shl(R2, 8, R6);
Shl(R3, 8, R7);
Shl(R4, 8, R8)
MD_pre(R1, R2, R11);
MD_pre(R7, R8, R12);
MD_pre(R3, R4, R13);
MD_pre(R7, R8, R14);
Store(R11);
Store(R12);
Store(R13);
Store(R14)
Post-Processing:
Load(R1);
Load(R2);
Load(R3);
Load(R4);
Shl(R1, 16, R5);
Shl(R2, 16, R6);
Shl(R3, 16, R7);
Shl(R4, 16, R8)
MD_post(R1, R2, R11);
MD_post(R7, R8, R12);
MD_post(R3, R4, R13);
MD_post(R7, R8, R14);
Store(R11);
Store(R12);
Store(R13);
Store(R14)

This is equal, on average, to one instruction per pixel on the 32-bit processor, and to a half instruction per pixel on a 64-bit processor. By comparison, said operation without the instructions MD_pre 50 and MD_post 60 would each require 52 instructions.

Simple comparisons conducted by the applicant show what is described hereinafter.

In the case of a 32-bit processor used for the pre-processing function or for the post-processing function in a context such as the one illustrated in FIG. 1, in order to process 1 Mpixel/s, a computing capacity of 1 Mops/s, 12 registers, and an input/output (I/O) capacity of 1 Mbit/s are required.

These data can be compared with the amount of work commonly required for processing standard video formats, such as QCIF (Quarter Common Intermediate Format), CIF (Common Intermediate Format), standard D1, and high definition (HDTV) formats, as tabulated below.

| | | | |
|---|---|---|---|
| QCIF | 4:2:0 | 0.6 Mpixel/s | 0.6 Mops |
| CIF | 4:2:0 | 4.66 Mpixel/s | 4.66 Mops |
| D1 | 4:2:0 | 15.5 Mpixel/s | 15.5 Mops |
| HDTV | 4:2:0 | 77.7 Mpixel/s | 77.7 Mops |

In the case of a 64-bit processor used for the pre-processing function or for the post-processing function in a context such as the one illustrated in FIG. 1, in order to process 1 Mpixel/s, a computing capacity of 0.5 Mops/s, once again with 12 registers, and an input/output (I/O) capacity of 2 Mbit/s are required.

These data can be compared with the amount of work corresponding to the QCIF, CIF, standard D1, and high definition (HDTV) formats, as tabulated below.

| | | | |
|---|---|---|---|
| QCIF | 4:2:0 | 0.6 Mpixel/s | 0.3 Mops |
| CIF | 4:2:0 | 4.66 Mpixel/s | 2.33 Mops |
| D1 | 4:2:0 | 15.5 Mpixel/s | 7.75 Mops |
| HDTV | 4:2:0 | 77.7 Mpixel/s | 38.85 Mops |

These above figures refer to millions of operations per second. In the case of RISC processors, this is equivalent to requiring frequencies in the order of megahertz. In the case of modern VLIW processors and superscalar processors, which are capable of executing multiple operations in just one cycle, this value must be divided by the typical value of level of parallelism of the instructions. For example, a parallelism of two should be easily obtained on said processors. For instance, on a 64-bit VLIW superscalar processor, only 4 MHz are necessary for the pre-processing and 4 MHz for the post-processing of a standard-definition sequence, and less than 20 MHz for high-definition sequences.

It will also be appreciated that the phenomena of stalling of the D-cache are in actual fact negligible, given that the process is carried out on altogether predictable data patterns.

Consequently, without prejudice to the principle of the invention, the details of construction and the embodiments may vary, even significantly, with respect to what is described and illustrated herein, purely by way of non-limiting example, without thereby departing from the scope of the invention, as defined in the ensuing claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A computer-implemented method comprising:
converting, by a computer processor a digital signal organized in pixels between a first format and a second format, said second format comprising multiple descriptions of the digital signal, the converting including:
ordering the pixels of the signal to be converted into at least one input register, wherein the ordering the pixels of the signal to be converted into at least one input register includes storing the pixels of the signal in first and second input registers; and
taking selectively the pixels from said at least one input register and placing them in an orderly way in at least one output register, wherein the taking selectively step is performed a plurality of times, generating each time one of said multiple descriptions of the signal in said second format and wherein the taking selectively includes:
taking a first subset of the pixels from the first input register and placing them in a first output register;
taking a second subset of the pixels from the second input register and placing them in the first output register with the first subset of pixels;
taking a third subset of the pixels from the first input register and placing them in a second output register; and
taking a fourth subset of the pixels from the second input register and placing them in the second output register with the third subset of pixels.

2. The method according to claim 1, wherein the taking selectively step is performed operating each time on different sets of pixels.

3. The method according to claim 1, wherein the taking selectively step includes taking from said at least one input register any M pixels, even non-adjacent ones, from each group of N pixels.

4. The method according to claim 1, wherein the taking selectively step includes taking from said at least one input register the first M pixels of each group of N pixels.

5. The method according to claim 1, wherein the taking selectively step includes taking from said at least one input register one pixel every N pixels.

6. The method according to claim 1, wherein the taking selectively step includes taking from said at least one input register the pixels of the signal to be converted in alternating positions of said at least one input register, placing them then in adjacent positions in said at least one output register.

7. The method according to claim 1, wherein the taking selectively step includes taking from said at least one input register any M pixels, even non-adjacent ones, from each group of N pixels.

8. The method according to claim 1, wherein the taking selectively step includes taking from said at least one input register the first M pixels of each group of N pixels.

9. The method according to claim 1, wherein the taking selectively step includes taking from said at least one input register one pixel every N pixels.

10. The method according to claim 1, wherein the taking selectively step includes taking the pixels of the signal to be converted in alternating positions of said at least one input register, placing them in adjacent positions in said at least one output register.

11. The method according to claim 1, wherein the at least one input register includes a first input register and a second input register, and the taking selectively step includes:
taking the pixels of the first input register and placing them in odd-positions of the at least one output register; and
taking the pixels of the second input register and placing them in even-positions of said at least one output register.

12. The method according to claim 1, wherein the taking selectively step includes taking said pixels of the signal to be converted in adjacent positions of said at least one input register, placing them in alternating positions in said at least one output register.

13. The method according to claim 1 wherein said at least one output register has a total number of positions equal to one half of a total number of positions of said at least one input register.

14. A system, comprising:
at least one input register;
at least one output register; and
converting means for converting a digital signal organized in pixels between a first format and a second format, said second format comprising multiple descriptions of the digital signal, the converting means including:
  means for ordering the pixels of the signal to be converted into said at least one input register, wherein the ordering the pixels of the signal to be converted into the at least one input register includes storing the pixels of the signal in first and second input registers; and
  means for taking selectively the pixels from said at least one input register and placing them in an orderly way in at least one output register, wherein the means for taking selectively include means for performing a plurality of times said operation of taking selectively said pixels of the signal to be converted, generating each time one of said multiple descriptions of the signal in said second format, wherein the taking selectively includes:
    taking a first subset of the pixels from the first input register and placing them in a first output register;
    taking a second subset of the pixels from the second input register and placing them in the first output register with the first subset of pixels;
    taking a third subset of the pixels from the first input register and placing them in a second output register; and
    taking a fourth subset of the pixels from the second input register and placing them in the second output register with the third subset of pixels.

15. The system according to claim 14, wherein the means for taking selectively include means for taking the pixels of the signal to be converted, operating each time on different sets of pixels.

16. The system according to claim 14, wherein the means for taking selectively include means for taking from said at least one input register any M pixels, even non-adjacent ones, from each group of N pixels.

17. The system according to claim 14, wherein the means for taking selectively include means for taking from said at least one input register the first M pixels of each group of N pixels.

18. The system according to claim 14, wherein the means for taking selectively include means for taking from said at least one input register one pixel every N pixels.

19. The system according to claim 14, wherein the means for taking selectively include means for taking from said at least one input register the pixels of the signal to be converted in alternating positions of said at least one input register, placing them then in adjacent positions in said at least one output register.

20. The system according to claim 14, wherein the means for taking selectively include means for taking from said at least one input register any M pixels, even non-adjacent ones, from each group of N pixels.

21. The system according to claim 14, wherein the means for taking selectively include means for taking from said at least one input register the first M pixels of each group of N pixels.

22. The system according to claim 14, wherein the means for taking selectively include means for taking from said at least one input register one pixel every N pixels.

23. The system according to claim 14, wherein the means for taking selectively include means for taking the pixels of the signal to be converted in alternating positions of said at least one input register, placing them then in adjacent positions in said at least one output register.

24. The system according to claim 14, wherein the at least one input register includes a first input register and a second input register, and the means for taking selectively include means for:
  taking the pixels of the first input register and putting them in odd-positions of said at least one output register; and
  taking the pixels of the second input register and putting them in even-positions of said at least one output register.

25. The system according to claim 14, wherein the means for taking selectively include means for taking said pixels of the signal to be converted in adjacent positions of said at least one input register, placing them then in alternating positions in said at least one output register.

26. The system according to claim 14 wherein said at least one output register has a number of positions of pixels equal to one half of the total pixel positions of said at least one input register.

27. The system according to claim 14 wherein the at least one input register, at least one output register, ordering means, and selectively taking means are part of a CPU.

28. A non-transitory computer-readable storage medium including program code that, when loaded into a memory of at least one computer, causes the computer to implement:
  converting a digital signal organized in pixels between a first format and a second format, said second format comprising multiple descriptions of the digital signal, the converting including:
    ordering the pixels of the signal to be converted into at least one input register, wherein the ordering the pixels of the signal to be converted into at least one input register includes storing the pixels of the signal in first and second input registers; and
    taking selectively the pixels from said at least one input register and placing them in an orderly way in at least one output register, wherein the taking selectively step is performed a plurality of times, generating each time one of said multiple descriptions of the signal in said second format, wherein the taking selectively includes:
      taking a first subset of the pixels from the first input register and placing them in a first output register;
      taking a second subset of the pixels from the second input register and placing them in the first output register with the first subset of pixels;
      taking a third subset of the pixels from the first input register and placing them in a second output register; and
      taking a fourth subset of the pixels from the second input register and placing them in the second output register with the third subset of pixels.

29. The non-transitory computer-readable storage medium according to claim 28, wherein said program code includes SIMD instructions.

30. A computer-implemented method of processing a digital signal organized in pixels, comprising:
  converting, by a computer processor, the digital signal organized in pixels from a first format to a second format, the second format including multiple descriptions of the digital signal, the converting step including:
  storing the pixels of the digital signal in first and second input registers;
  taking a first subset of the pixels from the first input register and placing them in a first output register; and
  taking a second subset of the pixels from the second input register and placing them in the first output register with the first subset of pixels;

taking a third subset of the pixels from the first input register and placing them in a second output register; and taking a fourth subset of the pixels from the second input register and placing them in the second output register with the third subset of pixels.

31. The method of claim 30, further comprising:

transmitting through a channel the digital signal in the second format;

converting the digital signal from the second format to the first format, the converting the digital signal from the second format to the first format including:

storing the first and third subsets of pixels into a third input register; storing the second and fourth subsets of pixels into a fourth input register;

taking the first and second subsets of pixels from the third and fourth input registers and placing them in a third output register; and taking the third and fourth subsets of pixels from the third and fourth input registers and placing them in a fourth output register.

32. A computer-implemented method of processing a digital signal organized in pixels, comprising:

converting, by a computer processor, the digital signal organized in pixels from a first format to a second format, one of the first and second formats including multiple descriptions of the digital signal, the converting step including:

storing the pixels of the digital signal in first and second input registers;

taking a first subset of the pixels from the first input register and placing them in a first output register;

taking a second subset of the pixels from the second input register and placing them in the first output register with the first subset of pixels;

taking a third subset of the pixels from the first input register and placing them in a second output register; and taking a fourth subset of the pixels from the second input register and placing them in the second output register with the third subset of pixels.

33. The method of claim 32, further comprising:

transmitting through a channel the digital signal in the second format; and converting the digital signal from the second format to the first format, the converting the digital signal from the second format to the first format including:

storing the first and third subsets of pixels into a third input register;

storing the second and fourth subsets of pixels into a fourth input register;

taking the first and second subsets of pixels from the third and fourth input registers and placing them in a third output register; and taking the third and fourth subsets of pixels from the third and fourth input registers and placing them in a fourth output register.

34. The method according to claim 1, further comprising:

transmitting through a channel the digital signal in the second format;

converting the digital signal from the second format to the first format, the converting the digital signal from the second format to the first format including:

storing the first and third subsets of pixels into a third input register;

storing the second and fourth subsets of pixels into a fourth input register;

taking the first and second subsets of pixels from the third and fourth input registers and placing them in a third output register; and taking the third and fourth subsets of pixels from the third and fourth input registers and placing them in a fourth output register.

35. The method according to claim 14, further comprising:

a transmitter in operable communication with the converting means configured to transmit through a channel the digital signal in the second format; and a converter in operable communication with the transmitter configured to convert the digital signal from the second format to the first format by:

storing the first and third subsets of pixels into a third input register;

storing the second and fourth subsets of pixels into a fourth input register;

taking the first and second subsets of pixels from the third and fourth input registers and placing them in a third output register; and taking the third and fourth subsets of pixels from the third and fourth input registers and placing them in a fourth output register.

36. The non-transitory computer-readable storage medium of claim 28, wherein the program code, when loaded into the memory of the at least one computer, further causes the at least one computer to implement:

transmitting through a channel the digital signal in the second format;

converting the digital signal from the second format to the first format, the converting the digital signal from the second format to the first format including:

storing the first and third subsets of pixels into a third input register;

storing the second and fourth subsets of pixels into a fourth input register;

taking the first and second subsets of pixels from the third and fourth input registers and placing them in a third output register; and taking the third and fourth subsets of pixels from the third and fourth input registers and placing them in a fourth output register.

* * * * *